June 16, 1925.
L. P. GEHRKE
1,542,691
MILK COOLER AND AERATOR
Filed March 22, 1923
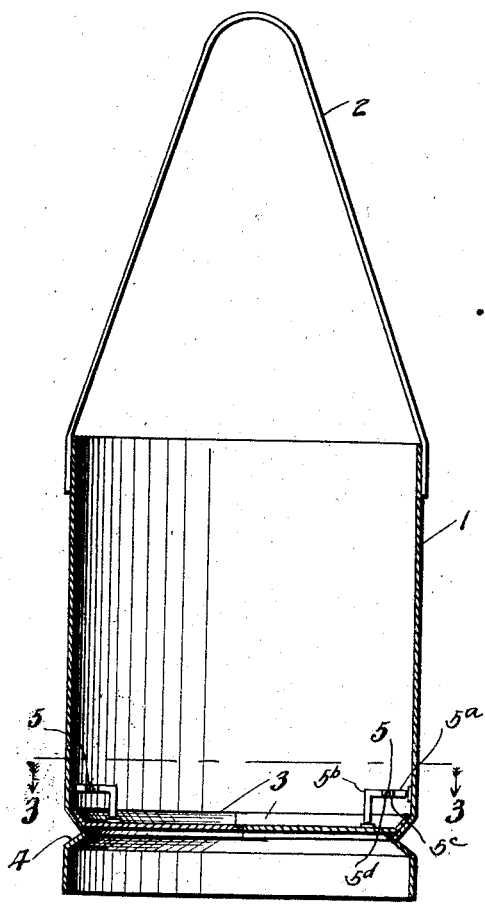
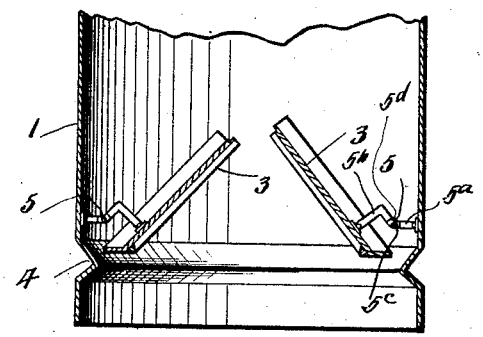
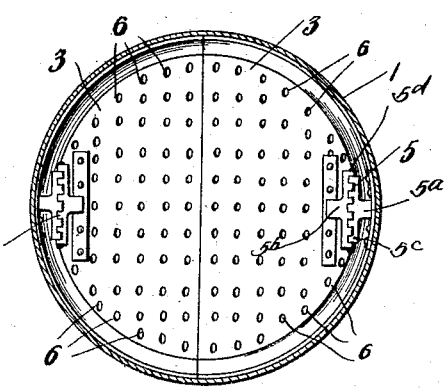
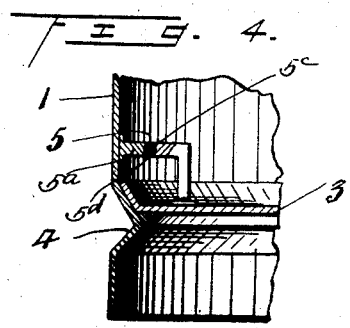
Inventor
L. P. Gehrke,
By
Attorney Patented June 16, 1925.

1,542,691

UNITED STATES PATENT OFFICE.

LENARD PAUL GEHRKE, OF SPENCER, WISCONSIN.

MILK COOLER AND AERATOR.

Application filed March 22, 1923. Serial No. 626,953.

*To all whom it may concern:*

Be it known that I, LENARD PAUL GEHRKE, a citizen of the United States, residing at Spencer, in the county of Marathon and State of Wisconsin, have invented certain new and useful Improvements in Milk Coolers and Aerators; and I do hereby declare the following to be a full, clear, and exact description of the invention, such as will enable others skilled in the art to which it appertains to make and use the same.

The invention has for its object the provision of a device for aerating and cooling milk, whereby to eliminate the animal heat and the natural odor, thereby preventing the early souring of the milk and otherwise preparing the same for consumption and factory use.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a vertical section of a milk cooler and aerator embodying the invention, the valve bottom being closed, Figure 2 is a detail section of the lower portion of the device, the valve bottom being open, Figure 3 is a horizontal section on the line 3—3 of Figure 1, and Figure 4 is a detail view showing more clearly the hinge connection between a valve leaf and the pail or vessel.

Corresponding and like parts are referred to in the following description and designated in the several views of the drawings by like reference characters.

The device comprises a pail or vessel 1 provided with a bail 2 and a valve bottom comprising similar leaves or members 3 which are hingedly connected at their outer edges to opposite sides of the vessel so as to open upwardly, as indicated most clearly in Figure 2. A rib 4 is pressed inwardly from the sides of the vessel near the bottom thereof and constitutes a seat for the leaves or members 3 comprising the valve.

The leaves or members 3 may be hinged to the vessel 1 in any preferred or convenient way to admit of the leaves opening upwardly at their inner edges. The hinge connections 5 consist of arms 5$^a$ extending from the wall of the vessel 1, and angular arms 5$^b$ projecting upwardly from leaves 3, said arms 5$^a$ and 5$^b$ having interlocking members 5$^c$ pivotally secured together by pintle 5$^d$. The valve, when closed, forms a relatively close bottom for the pail and the leaves 3 are provided with openings 6 for the discharge of the milk in streams, whereby the same is subjected to the action of the atmosphere for cooling, aerating and deodorizing.

The parts of the device are preferably constructed of sheet metal, although any suitable material may be employed, and the vessel or pail 1 may be of any capacity and outline.

In the operation of the device, the milk to be treated is placed in a suitable container and the device is lowered therein. As the vessel 1 is immersed in the milk, the leaves 3 comprising the valve, open upwardly whereby to provide ready access of the milk into the vessel. Upon withdrawing the device from the milk, the valve closes and upon holding the vessel 1 suspended above the container holding the milk to be treated, the milk contained in the vessel 1 escapes through the openings 6 of the valve bottom and flows back into the container in fine streams, thereby exposing a large surface of the milk to the action of the air, whereby the milk is cooled, aerated and deodorized.

What is claimed is:

1. A milk cooler and aerator comprising a vessel having an inner rib near its lower end, a valve bottom comprising a plurality of leaves, hinges connecting said leaves to the vessel, said leaves normally engaging and being supported by said rib, said leaves being capable of upward swinging movement in order to open through impact with the milk, and said leaves being perforated.

2. A milk cooler and aerator comprising a vessel having an inner rib near its lower end, a valve bottom comprising a plurality of leaves, hinges connecting said leaves to the vessel, said leaves normally engaging and being supported by said rib, said leaves being capable of upward swinging movement in order to open through impact with the milk, and said leaves being perforated, and the pivots of the leaves being offset with respect to the leaves and with respect to the inner wall of the vessel.

In testimony whereof I affix my signature in presence of two witnesses.

LENARD PAUL GEHRKE.

Witnesses:
    ED. HENDRICKSON,
    HAROLD TUCKER.